United States Patent
Ishizone et al.

(10) Patent No.: US 9,239,645 B2
(45) Date of Patent: Jan. 19, 2016

(54) INPUT DEVICE AND METHOD FOR DETECTING LOADS ON MULTIPLE POINTS USING THE INPUT DEVICE

(71) Applicant: ALPS ELECTRIC CO., LTD., Tokyo (JP)

(72) Inventors: Masahiko Ishizone, Niigata-ken (JP); Masafumi Kaneko, Niigata-ken (JP); Yukihiro Gorai, Niigata-ken (JP); Takashi Sato, Niigata-ken (JP); Eiji Umetsu, Niigata-ken (JP)

(73) Assignee: ALPS ELECTRIC CO., LTD., Tokyo (JP)

(*) Notice: Subject to any disclaimer, the term of this patent is extended or adjusted under 35 U.S.C. 154(b) by 141 days.

(21) Appl. No.: 14/074,410

(22) Filed: Nov. 7, 2013

(65) Prior Publication Data

US 2014/0062956 A1  Mar. 6, 2014

Related U.S. Application Data (63) Continuation of application No. PCT/JP2012/053471, filed on Feb. 15, 2012.

(30) Foreign Application Priority Data

May 12, 2011  (JP) .................. 2011-106789
Oct. 28, 2011  (JP) .................. 2011-236760

(51) Int. Cl.
G06F 3/041 (2006.01)
G06F 3/044 (2006.01)

(52) U.S. Cl.
CPC .............. *G06F 3/0414* (2013.01); *G06F 3/044* (2013.01)

(58) Field of Classification Search
CPC ................................ G06F 3/044; G06F 3/0414
See application file for complete search history.

(56) References Cited

U.S. PATENT DOCUMENTS

| | | | |
|---|---|---|---|
| 2010/0164906 A1* | 7/2010 | Fukunaga | G06F 3/042 345/175 |
| 2010/0229091 A1 | 9/2010 | Homma et al. | |
| 2010/0289508 A1* | 11/2010 | Joguet et al. | 324/686 |

FOREIGN PATENT DOCUMENTS

| | | |
|---|---|---|
| JP | 2009-87311 | 4/2009 |
| JP | 2010-146206 | 7/2010 |
| JP | 2010-211399 | 9/2010 |
| JP | 2010-244252 | 10/2010 |
| JP | 2010-244514 | 10/2010 |

(Continued)

OTHER PUBLICATIONS

Search Report dated Mar. 27, 2012 from International Application No. PCT/JP2012/053471.

(Continued)

*Primary Examiner* — Alexander Eisen
*Assistant Examiner* — Cory Almeida
(74) *Attorney, Agent, or Firm* — Beyer Law Group LLP (57) ABSTRACT

An input device includes a capacitance type touch panel sensor configured to detect positional coordinates of multiple pressing points that are simultaneously pressed on an operation face, load detection sensors configured to detect barycentric coordinates of and a barycentric load on the pressing points, and a controller configured to calculate loads on the pressing points on the basis of the positional coordinates of, the barycentric coordinates of, and the barycentric load on the pressing points.

6 Claims, 9 Drawing Sheets

(56) References Cited

FOREIGN PATENT DOCUMENTS

| | | |
|---|---|---|
| JP | 2010-272143 | 12/2010 |
| JP | 2011-59822 | 3/2011 |
| JP | 2011-123823 | 6/2011 |
| WO | 02/35461 | 5/2002 |

OTHER PUBLICATIONS

Office action dated Oct. 14, 2014 from Japanese Application No. 2013-513949.

* cited by examiner

INPUT DEVICE AND METHOD FOR DETECTING LOADS ON MULTIPLE POINTS USING THE INPUT DEVICE

CLAIM OF PRIORITY

This application is a Continuation of International Application No. PCT/JP2012/053471 filed on Feb. 15, 2012, which claims benefit of Japanese Patent Application No. 2011-106789 filed on May 12, 2011 and No. 2011-236760 filed on Oct. 28, 2011. The entire contents of each application noted above are hereby incorporated by reference.

BACKGROUND OF THE INVENTION

1. Field of the Invention

The present invention relates to an input device mounted on a mobile device or another electronic device and operated with a finger or the like which touches an operation panel.

2. Description of the Related Art

Each of Japanese Unexamined Patent Application Publication Nos. 2009-87311, 2010-146206, 2010-211399, and 2010-244514 describes an input device capable of detecting the positional coordinates of and a load on a pressing point upon operating an operation face with a finger or the like.

In these Patent Application Publications cited above, there is only one pressing point whose positional coordinates and load are detectable, and nothing is described about detection of the positional coordinates of and loads on multiple pressing points that are simultaneously pressed.

SUMMARY OF THE INVENTION

The present invention provides an input device capable of obtaining loads on multiple pressing points that are simultaneously pressed, and a method for detecting loads on multiple points using the input device.

Solution to Problem

An input device according to a first aspect of the present invention includes a position detection sensor configured to detect positional coordinates of multiple pressing points that are simultaneously pressed on an operation face; a load detection sensor configured to detect barycentric coordinates of and a barycentric load on the pressing points; and a controller configured to calculate loads on the pressing points on the basis of the positional coordinates of, the barycentric coordinates of, and the barycentric load on the pressing points.

A multiple point load detecting method according to a second aspect of the present invention obtains, by a controller, when multiple different points on an operation face are simultaneously pressed, loads on the multiple pressing points by using a position detection sensor configured to detect pressing positions of multiple pressing points that are simultaneously pressed on the operation face and a load detection sensor configured to detect a barycentric position of and a barycentric load on the pressing points, the method including: a coordinate detection step of obtaining positional coordinates of the pressing points on the basis of an output of the position detection sensor; a barycenter detection step of obtaining barycentric coordinates of and a barycentric load on the pressing points on the basis of an output of the load detection sensor; and a load calculation step of calculating loads on the pressing points on the basis of the positional coordinates of, the barycentric coordinates of, and the barycentric load on the pressing points.

According to the aspects of the present invention as described above, when multiple points on an operation face are simultaneously pressed, there is provided a controller configured to calculate loads on the pressing points on the basis of pieces of data including positional coordinates of the pressing points, obtained from the output of the position detection sensor, and the barycentric coordinates of and the barycentric load on the pressing points, obtained from the output of the load detection sensor. Through the above-described steps, the controller can calculate the loads on the pressing points. In contrast, a controller similar to that in the aspects of the present invention is disclosed in none of the Patent Application Publications cited earlier, and configurations in these Patent Application Publications are such that, when multiple points are simultaneously pressed, loads on the pressing points are undetectable.

According to the aspects of the present invention as described above, compared with the configuration of the input device described in each of these Patent Application Publications, loads on multiple pressing points that are simultaneously pressed can be appropriately and easily calculated without complicating the configuration of the input device.

In the first aspect of the present invention, the load detection sensor preferably includes multiple load detection sensors provided on the back side of periphery of a panel whose front face is the operation face side. Accordingly, the barycentric coordinates and the barycentric load can be appropriately and easily detected.

Also in the first aspect of the present invention, the position detection sensor is preferably a capacitance type touch panel sensor. Accordingly, the positional coordinates of multiple pressing points that are simultaneously pressed can be more accurately detected.

Also in the first aspect of the present invention, upon detection of the fact that simultaneously-pressed three pressing points are all on the same straight line, the controller preferably corrects the positional coordinate and the barycentric coordinate of any of the pressing points, and calculates the loads on the pressing points.

In addition, in the second aspect of the present invention, the multiple point load detecting method preferably further includes, between the coordinate detection step and the barycenter detection step, a pressing point determination step of detecting whether or not three pressing points that are simultaneously pressed are all on the same straight line, and, when it is detected that all the pressing points are on the same straight line, proceeding to the next correction step, and, when it is not detected that all the pressing points are on the same straight line, proceeding to the load calculation step; and a correction step of correcting, when it is detected that all the pressing points are on the same straight line, the positional coordinate and the barycentric coordinate of any of the pressing points, wherein, when the method proceeds from the correction step to the load calculation step, the load calculation is performed using the corrected positional coordinate and the corrected barycentric coordinate.

Further, the multiple point load detecting method preferably further includes a load determination step of determining whether or not each of the loads on the pressing points is greater than 0 and less than the barycentric load, the loads being calculated after the method proceeds from the correction step to the load calculation step, wherein, when the load on any of the pressing points is less than or equal to 0 or greater than or equal to the barycentric load, the method preferably returns to the correction step, changes a correction value for the barycentric coordinate, and performs load calculation again.

Accordingly, even when three pressing points are aligned on the same straight line, loads on the pressing points can be calculated.

According to the aspects of the present invention, loads on multiple pressing points that are simultaneously pressed can be appropriately and easily calculated without complicating the configuration of the input device.

BRIEF DESCRIPTION OF THE DRAWINGS

FIGS. 4A and 4B are explanatory diagrams of a load detection sensor, in which

DESCRIPTION OF THE PREFERRED EMBODIMENTS

Figure 1:
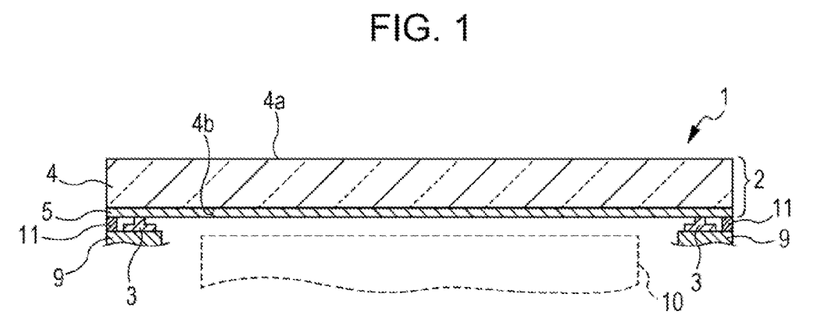
FIG. 1 is a partial vertical cross-sectional view of an input device (touch panel) according to an embodiment of the present invention.
Figure 2:
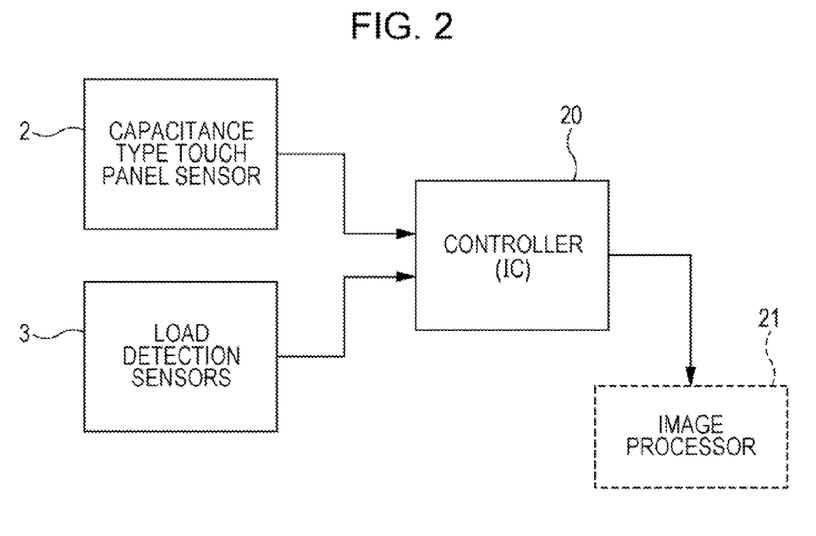
FIG. 2 is a block diagram of the input device of the present embodiment.
Figure 3:
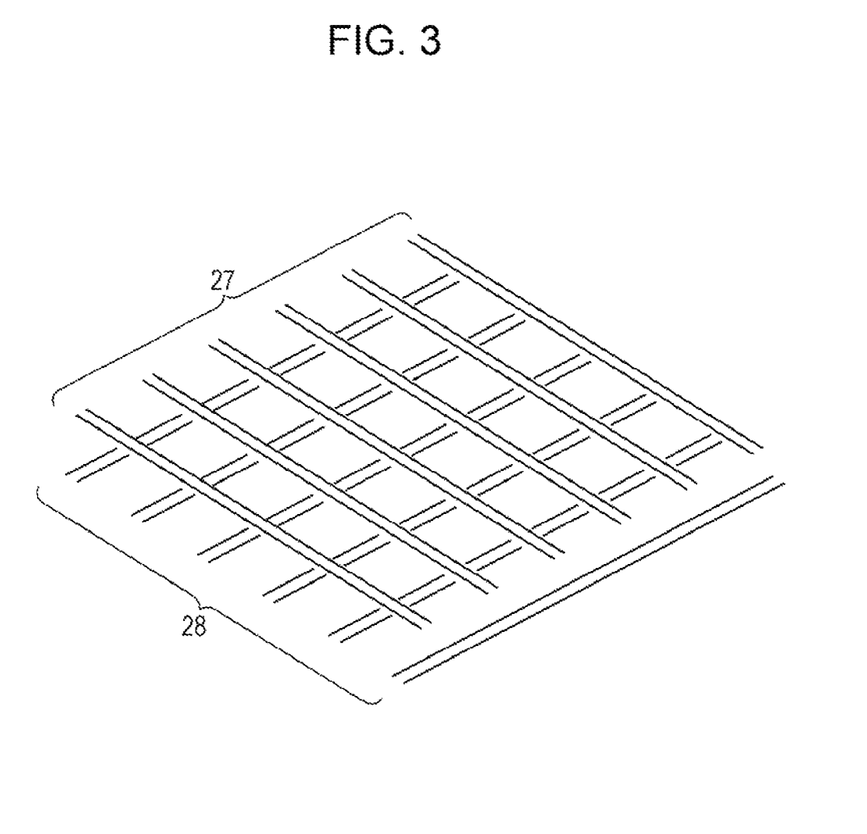
FIG. 3 is an explanatory diagram of a capacitance type touch panel sensor.
Figure 4A:
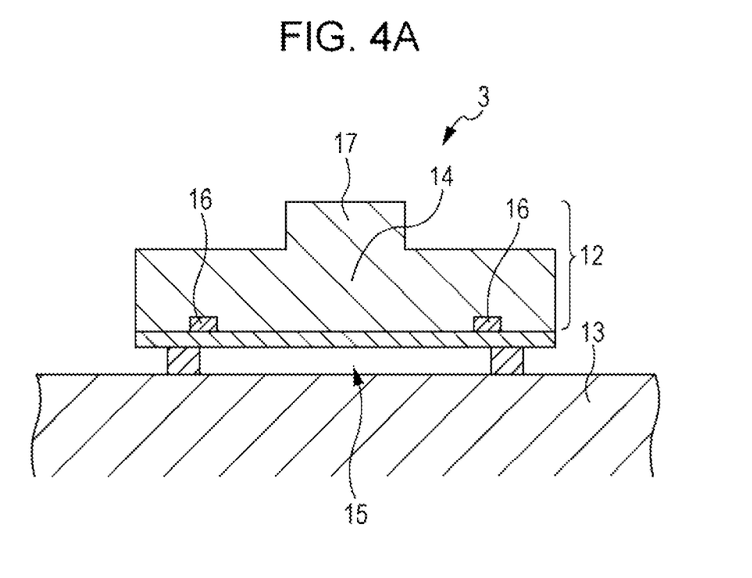
FIG. 4A is a partial vertical cross-sectional view of, and FIG. 4B is a back perspective view of a sensor substrate configuring the load detection sensor.
Figure 4B:
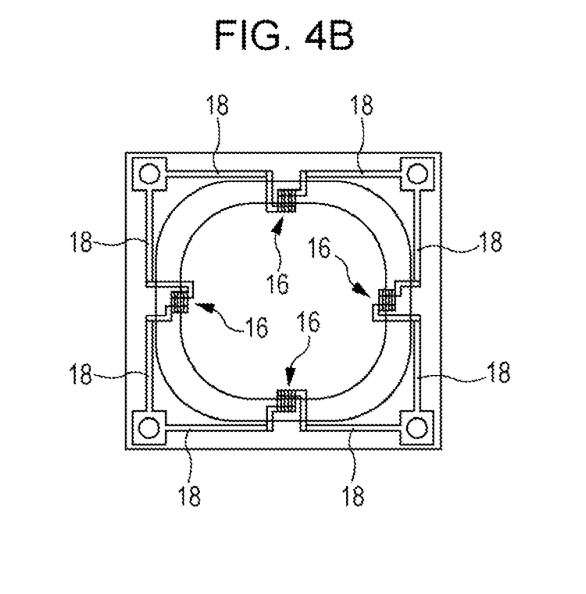

FIG. 1 is a partial vertical cross-sectional view of an input device (touch panel) according to an embodiment of the present invention; FIG. 2 is a block diagram of the input device of the present embodiment; FIG. 3 is an explanatory diagram of a capacitance type touch panel sensor; and FIGS. 4A and 4B are explanatory diagrams of a load detection sensor, in which FIG. 4A is a partial vertical cross-sectional view of, and FIG. 4B is a back perspective view of a sensor substrate configuring the load detection sensor.

An input device (touch panel) 1 according to the present embodiment has a configuration in which multiple load detection sensors 3 are provided on the back side of a capacitance type touch panel sensor (position detection sensor) 2.

The capacitance type touch panel sensor 2 is configured including a transparent operation panel 4, and a sensor layer 5 provided on a back face 4b of the operation panel 4. The operation panel 4 is configured with glass, plastic, or the like. The front face of the operation panel 4 is an operation face 4a.

The sensor layer 5 is configured including, for example, as illustrated in FIG. 3, X electrodes 27 and Y electrodes 28 formed of ITO or the like. The X electrodes 27 are insulated from the Y electrodes 28. Also, the X electrodes 27 are orthogonal to the Y electrodes 28. When a finger presses the top of the operation face 4a, the capacitance between the finger and each of the electrodes 27 and 28 changes. On the basis of this change in capacitance, the operation position of the finger is detectable. In the capacitance type touch panel sensor 2, even when multiple points on the operation face 4a are simultaneously pressed, the X coordinate and the Y coordinate of each of the pressing points are detectable on the basis of the above-described change in capacitance. The configuration of the sensor layer 5 is not limited to that in FIG. 3. As in FIG. 3, the electrodes may have a two-layer structure including the X electrodes 27 and the Y electrodes 28, or the electrodes may be configured with a single-layer structure. Also, the capacitance type touch panel sensor 2 may be of resistive film type or the like, instead of capacitance type. In the case of resistive film type, detection of the positional coordinates of multiple pressing points that are simultaneously pressed is made possible by separating a resistive film on the same plane into plural portions. However, capacitance type enables more accurate detection of the positional coordinates of multiple pressing points that are simultaneously pressed.

Although not illustrated in FIG. 1, a decorative layer provided around the back face 4b of the operation panel 4 enables separation into an operation area, where a liquid crystal display (LCD) 10 is displayed through the operation panel 4 and operation with the operation face 4a is enabled, and an opaque decorative area rimming around the operation area. In the decorative area, metal wire provided in the sensor layer 5 is routed, and the metal wire is not viewable from the operation face 4a side. Also, in the decorative area, the load detection sensors 3, described next, may be arranged.

The load detection sensors 3 each include, as illustrated in FIG. 4A, a sensor substrate 12 and a base substrate 13. On the sensor substrate 12, a displacement portion 14 and a protruding pressure receiving portion 17 that protrudes upward on the top face of the displacement portion 14 are provided. A certain space portion 15 is formed between the sensor substrate 12 and the base substrate 13, which causes the displacement portion 14 to be displaced in a height direction upon reception of a load. As illustrated in FIGS. 4A and 4B, multiple piezoelectric resistive elements 16 are provided as distortion detection elements on the back face of the sensor substrate 12. When the displacement portion 14 is displaced in a height direction in response to a load received by the pressure receiving portion 17, the electric resistances of the individual piezoelectric resistive elements 16 change in accordance with the displacement amount, and the midpoint potential of a bridge circuit configured with the individual piezoelectric resistive elements 16 changes, thereby obtaining a sensor output. As illustrated in FIG. 4B, wire portions 18 routed from the individual piezoelectric resistive elements 16 are electrically connected to pad portions, which are not illustrated.

The load detection sensors 3 according to the present embodiment may have a configuration other than that illustrated in FIGS. 4A and 4B. For example, the load detection sensors 3 may be configured to enable detection of a load on the basis of a change in capacitance that occurs in response to a change in distance between two electrodes upon pressing of the operation face 4a.

Figure 5A:
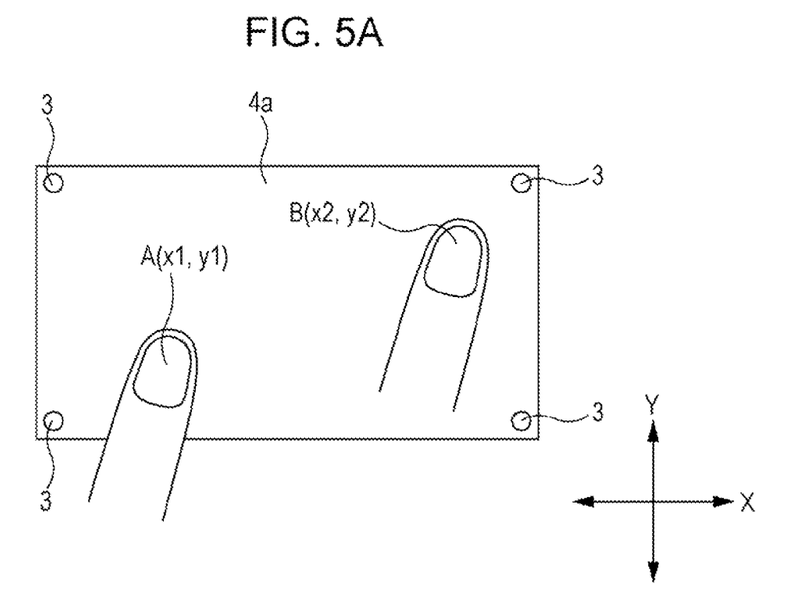
FIGS. 5A and 5B are plan views of the input device of the present embodiment, which are particularly operation state diagrams for describing that loads on two pressing points that are simultaneously pressed can be obtained.

As illustrated in FIG. 1, the load detection sensors 3 are arranged on the back side of the capacitance type touch panel sensor 2. The load detection sensors 3 are arranged, for example, in four corners of the periphery of the operation face 4a, as illustrated in FIG. 5A. Also, as illustrated in FIG. 1, supporting portions 9 that support the load detection sensors 3 are provided, and the supporting portions 9 and the capacitance type touch panel sensor 2 are connected by connection portions 11 that are deformable in a height direction. Accordingly, the operation panel 4 moves downward upon pressing of the operation face 4a, and loads can be applied to the load detection sensors 3. The connection portions 11 are, for example, double-sided tape.

The supporting structure of the load detection sensors 3 in the input device 1 is not limited to that illustrated in FIG. 1. In addition, the positions of the load detection sensors 3 in the input device 1 are not limited to those illustrated in FIG. 5A. For example, the load detection sensors 3 may be arranged in central portions of the individual sides of the periphery of the touch panel 1. The load detection sensors 3 may appropriately be arranged at positions at which loads of pressing forces are appropriately detectable.

As illustrated in FIG. 2, the touch panel 1 of the present embodiment includes a controller (IC) 20 connected to the capacitance type touch panel sensor 2 and the load detection sensors 3. Data from the controller 20 can be transmitted to an image processor 21 of a main body of an apparatus. The controller 20 is configured to be capable of calculating loads on multiple pressing points on the operation face 4a that are simultaneously pressed.

Hereinafter, using FIGS. 5A, 5B, and 6, an algorithm for obtaining loads on pressing points that are simultaneously pressed will be described.

Figure 6:
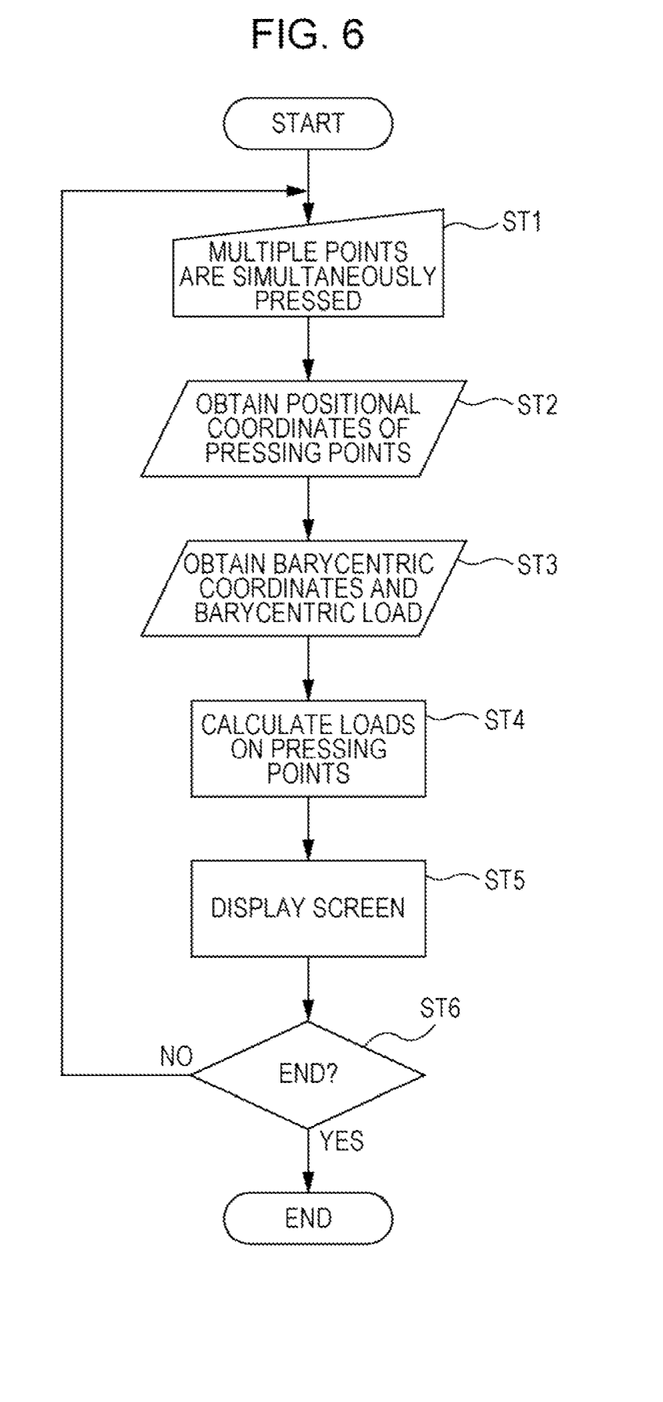
FIG. 6 is a flowchart of a process performed using the input device of the present embodiment upon simultaneously pressing multiple points.

FIG. 5A illustrates a plan view in the case where multiple different points on the operation face 4a of the input device 1 according to the present embodiment are simultaneously pressed (step ST1 in FIG. 6).

At this time, on the basis of the output from the capacitance type touch panel sensor 2, the controller 20 illustrated in FIG. 2 is capable of obtaining the positional coordinates (x1, y1) of a pressing point A and the positional coordinates (x2, y2) of a pressing point B (step ST2 (coordinate detection step) in FIG. 6).

Figure 5B:
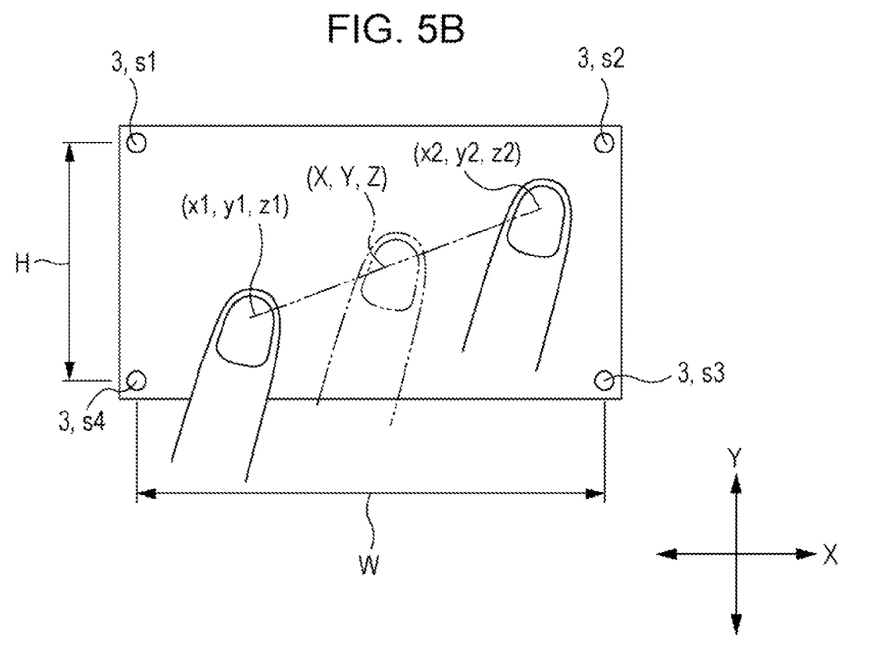

Further, as illustrated in FIG. 5B, on the basis of the output of each of the load detection sensors 3, the controller 20 illustrated in FIG. 2 is capable of obtaining the barycentric coordinates (X, Y) of and the barycentric load (Z) on the pressing points A and B (step ST3 (barycenter detection step) in FIG. 6).

Here, the barycentric coordinates (X, Y) and the barycentric load (Z) can be calculated by the following equations (1) using the sensor output of each of the load detection sensors 3 and the like:

$$X=(s2+s3)/\{(s1+s4)+(s2+s3)\}\times W$$

$$Y=(s3+s4)/\{(s1+s2)+(s3+s4)\}\times H$$

$$Z=(s1+s2+s3+s4)/S \qquad (1)$$

Here, s1, s2, s3, and s4 indicate the sensor outputs from the individual load detection sensors 3 illustrated in FIG. 5B, and their unit is, for example, mV. Also, S indicates the sensor sensitivity of the load detection sensors 3, and its unit is, for example, mV/N. Also, W indicates the width between the centers of the load detection sensors 3 arranged in the X direction, and H indicates the height between the centers of the load detection sensors 3 arranged in the Y direction. Note that the above-described equations (1) are only one example for obtaining the barycentric coordinates (X, Y) and the barycentric load (Z), and the method is not limited to this method of obtaining the barycentric coordinates (X, Y) and the barycentric load (Z) using these equations.

Also, the following equations (2) hold true between the barycentric coordinates (X, Y) and the barycentric load (Z), the positional coordinates (x1, y1, x2, y2) of the pressing points A and B, and loads (z1, z2) acting on the pressing points A and B:

$$X=(z1x1+z2x2)/(z1+z2)$$

$$Y=(z1y1+z2y2)/(z1+z2)$$

$$Z=z1+z2 \qquad (2)$$

As described above, the positional coordinates (x1, y1) and (x2, y2) of the pressing points A and B are known on the basis of the output from the capacitance type touch panel sensor 2, and the barycentric coordinates (X, Y) and the barycentric load (Z) are known on the basis of the outputs from the load detection sensors 3.

Therefore, the loads (z1, z2) on the pressing points A and B can be calculated on the basis of the above-described equations (2) by using the following equations (3) (step ST4 (load calculation step) in FIG. 6):

$$z1=Z(x2-X)/(*x2-x1)$$

$$z2=Z(X-x1)/(x2-x1) \qquad (3)$$

The pieces of data of the loads (z1, z2) on and the positional coordinates (x1, y1, x2, y2) of the pressing points A and B are transmitted to the image processor 21 illustrated in FIG. 2, and the image processor 21 performs image display processing on the liquid crystal display 10 on the basis of the transmitted data (step ST5 in FIG. 6). For example, the screen display can be changed in accordance with the weights of the loads on the pressing points A and B.

The above-described algorithm for calculating the loads (z1, z2) on the pressing points A and B may be performed at all times upon simultaneous pressing of multiple points on the operation face 4a after power is turned ON, or may be controlled to be performed only in a certain mode and may be ended in response to the start of a mode other than the certain mode (step ST6 in FIG. 6).

Note that the order of step ST2 and step ST3 in FIG. 6 does not indicate a temporal order; steps performed between step ST1 and step ST4 are arranged in the order of description.

Figure 7A:
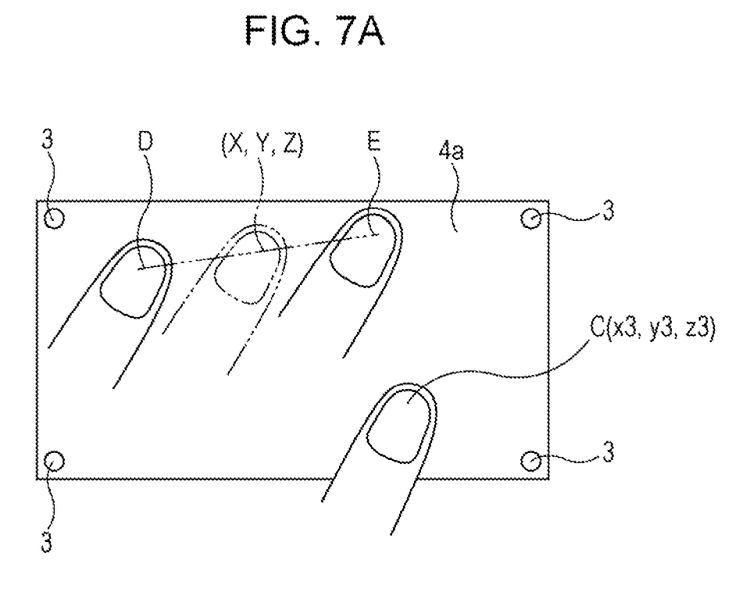
FIGS. 7A and 7B are operation state diagrams for describing that loads on two pressing points that are simultaneously pressed cannot be obtained by input devices of comparative examples.
Figure 7B:
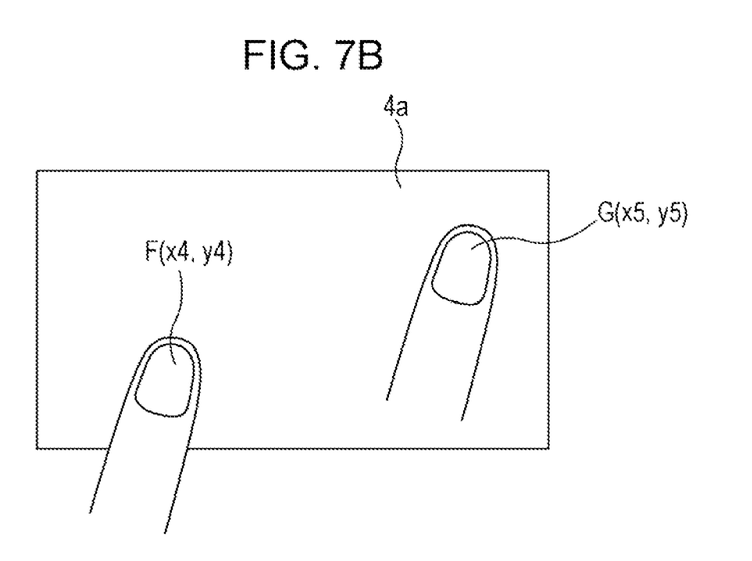

FIGS. 7A and 7B illustrate input devices of comparative examples. In FIG. 7A, the input device includes the load detection sensors 3, but does not include the sensor layer 5 illustrated in FIG. 1. That is, the configuration includes the load detection sensors 3, without including the sensor layer 5, on the back face of the operation panel 4.

When a pressing point C of the operation face 4a is pressed as in FIG. 7A, if the pressing point C is one point, the positional coordinates (x3, y3) of and the load (z3) on the pressing point C can be obtained by the above-described equations (1). Though the pressing point C and pressing points D and E are illustrated in FIG. 7A, operation on the pressing point C is different from operation on the pressing points D and E.

If the pressing point C is one point as described above, both the positional coordinates and the load can be obtained only with the load detection sensors 3. However, when the two pressing points D and E on the operation face 4a are simultaneously pressed, although the barycentric coordinates (X, Y) of and the barycentric load (Z) on the pressing points D and E can be obtained, both the positional coordinates of and the load on each of the pressing points D and E cannot be obtained.

Meanwhile, the input device of the comparative example, illustrated in FIG. 7B, includes the sensor layer 5 but does not include the load detection sensors 3. That is, the configuration includes only the capacitance type touch panel sensor 2 illustrated in FIG. 1.

In FIG. 7B, when two points on the operation face 4a are simultaneously pressed, the positional coordinates (x4, y4) and (x5, y5) of pressing points F and G can be obtained. However, loads on the pressing points F and G cannot be detected.

On the contrary, the input device 1 of the present embodiment includes the capacitance type touch panel sensor (position detector sensor) 2 and the load detection sensors 3, and further includes the controller 20 capable of calculating the loads (z1, z2) on the pressing points A and B on the basis of pieces of data of the positional coordinates (x1, y1) and (x2, y2) of, the barycentric coordinates (X, Y) of, and the barycentric load (Z) on the pressing points A and B. As described above, the present embodiment is characterized in the point that, instead of the fact that the capacitance type touch panel sensor 2 and the load detection sensors 3 are simply combined, the controller 20 capable of calculating the loads on multiple pressing points that are simultaneously pressed is provided.

The controller 20, which is capable of calculating loads on the pressing points A and B, is not described in any of the Patent Application Publications cited earlier. In each of these Patent Application Publications, the configuration is such that, when multiple points are simultaneously pressed, loads on the pressing points are not detectable. As described above, in the present embodiment, compared with the configuration of the input device described in each of these Patent Application Publications, loads on multiple pressing points that are simultaneously pressed can be appropriately and easily calculated without complicating the configuration of the input device 1.

Figure 8A:
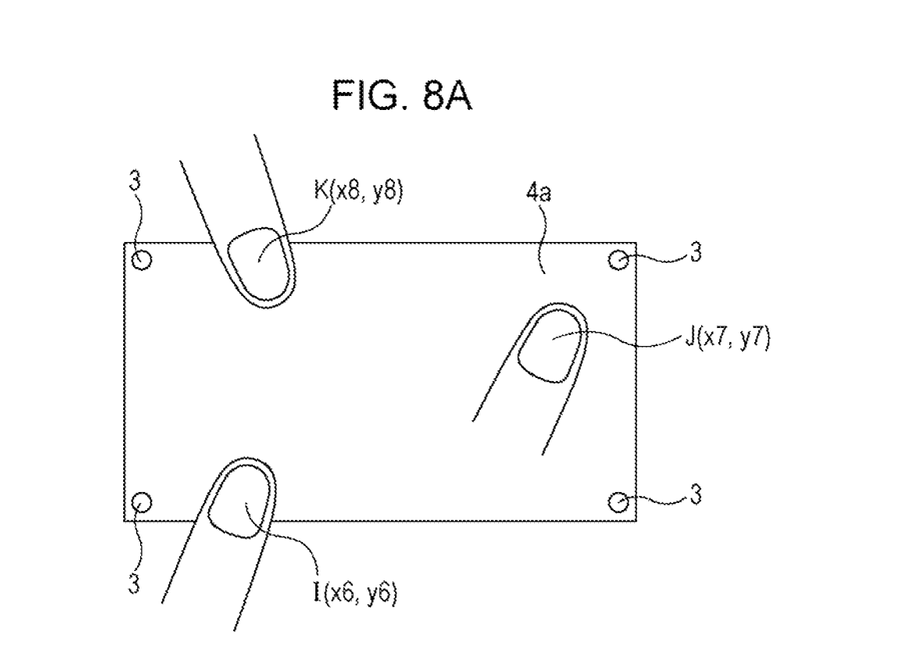
FIGS. 8A and 8B are operation state diagrams for describing that loads on three pressing points that are simultaneously pressed can be obtained by using the input device of the present embodiment.
Figure 8B:
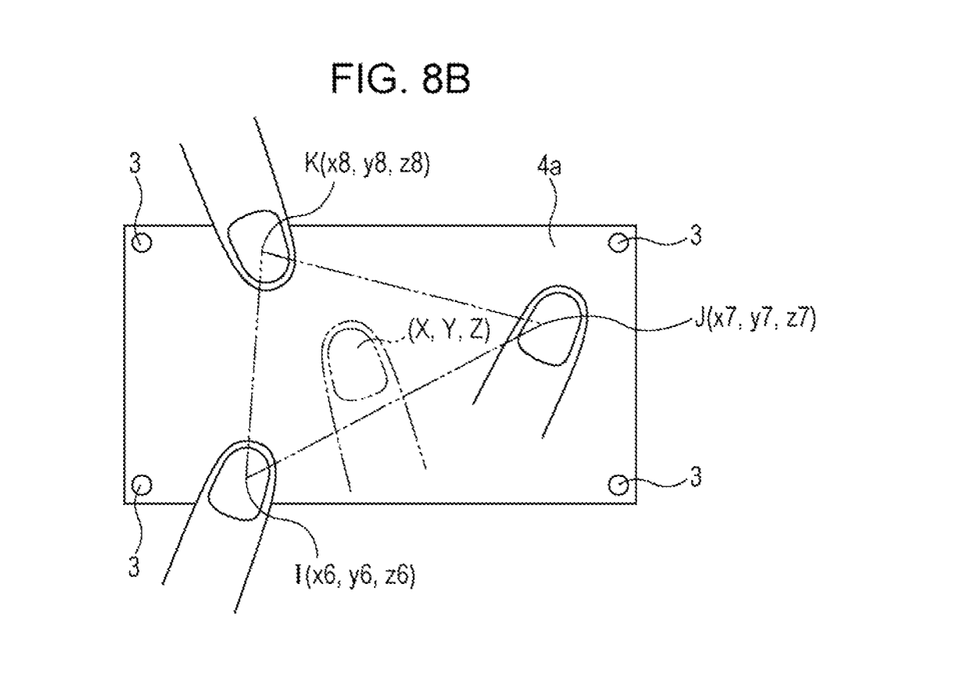

In FIG. 8A, an example in which three points are simultaneously pressed is illustrated. Firstly in step ST2 in FIG. 6, the positional coordinates (x6, y6), (x7, y7), and (x8, y8) of pressing points I, J, and K can be obtained. Next, in step ST3 in FIG. 6, the barycentric coordinates (X, Y) of and the barycentric load (Z) on the pressing points I, J, and K can be obtained.

Loads (z6, z7, z8) on the pressing points I, J, and K can be calculated by the following equations (4) (step ST4 in FIG. 6):

$$z6 = \frac{Z\{(y8-Y)(x7-x8)-(x8-X)(y7-y8)\}}{\{(x6-x8)(y7-y8)-(x7-x8)(y6-y8)\}} \quad (4)$$

$$z7 = \frac{Z\{(x8-X)(y6-y8)-(y8-Y)(x6-x8)\}}{\{(x6-x8)(y7-y8)-(x7-x8)(y6-y8)\}}$$

$$z8 = \frac{Z\{(y7-Y)(x6-x8)-(y6-Y)(x7-x8)-(x8-X)(y6-Y7)\}}{\{(x6-x8)(y7-y8)-(x7-x8)(y6-y8)\}}$$

Figure 9:
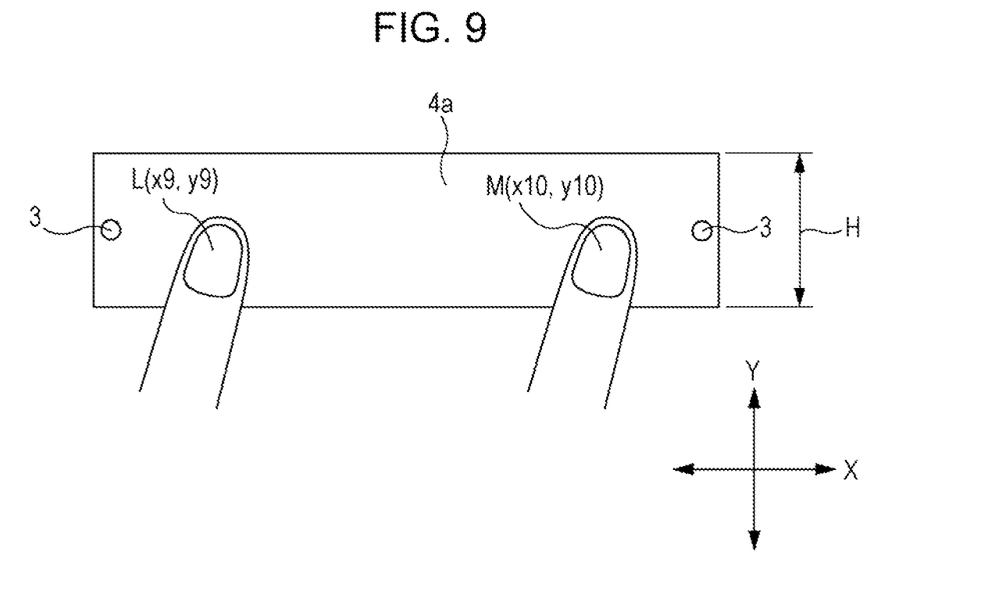
FIG. 9 is a plan view for describing the configuration of an input device according to another embodiment.

Also, in the embodiment in FIGS. 5A, 5B, 8A, and 8B, the load detection sensors 3 are provided in four corners of the operation face 4a. Alternatively, for example, as illustrated in FIG. 9, the configuration may be such that two load detection sensors 3 are provided on two ends in the X direction. In FIG. 9, because the height H in the Y direction of the operation face 4a is short, the Y coordinates of pressing points L and M are not demanded, which is suited for the configuration for detecting the X coordinates (x9, x10) of and loads (z9, z10) on the pressing points L and M.

Figure 10:
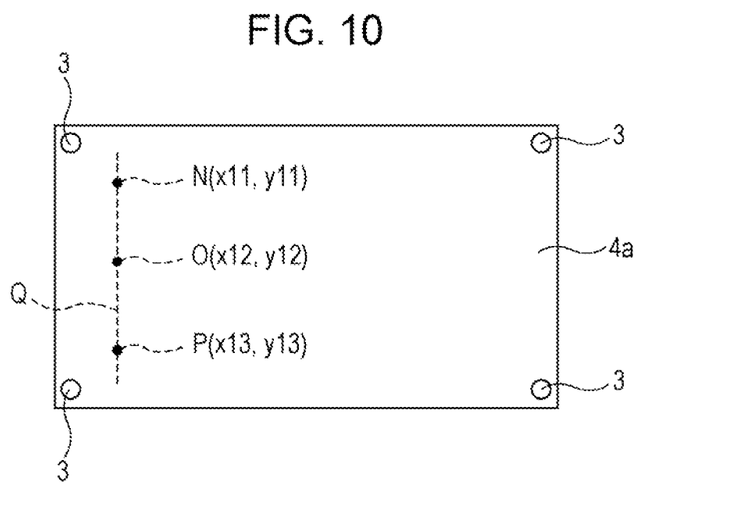
FIG. 10 is a plan view illustrating a state of the input device of the present embodiment in which all three pressing points that are simultaneously pressed are aligned on the same straight line.

In the embodiment in FIG. 10, the state is such that, when three points are simultaneously pressed, pressing points N, O, and P are aligned on the same straight line Q. However, to detect loads on the pressing points N, O, and P by using the above-described equations (4), the denominators in equations (4) become 0, and it is thus understood that the loads are undetectable.

To this end, in the present embodiment, the controller 20 (see FIG. 2) has the function of detecting whether all the three pressing points N, O, and P are on the same straight line Q. In addition, when it is determined that the three pressing points N, O, and P are on the same straight line Q, control is performed to correct the coordinate data, and thereafter, to calculate the loads.

Figure 11:
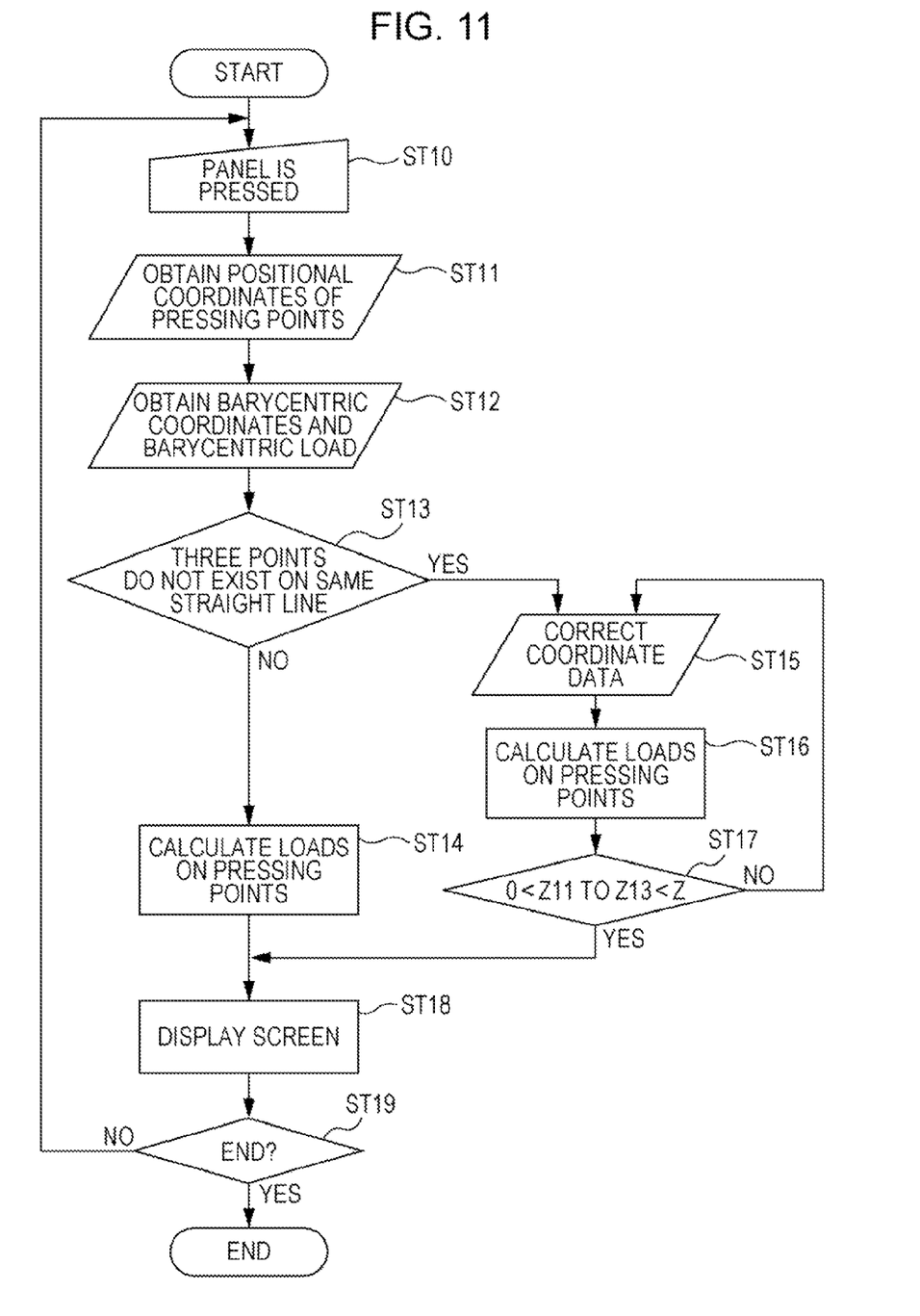
FIG. 11 is a flowchart for enabling load calculation in the case where three pressing points are aligned on the same straight line, as illustrated in FIG. 10.

FIG. 11 is a flowchart of determining whether all the simultaneously-pressed three pressing points N, O, and P are on the same straight line Q, and, when it is determined that the pressing points N, O, and P are on the same straight lien Q, having another routine for calculating the loads.

In step ST10 in FIG. 11, three different points on the operation face 4a illustrated in FIG. 10 are simultaneously pressed. At this time, the state is such that all the pressing points N, O, and P are aligned on the same straight line Q.

Step ST11 (coordinate detection step) in FIG. 11 obtains, by the controller 20 illustrated in FIG. 2, the positional coordinates (x11, y11), (x12, y12), and (x13, y13) of the pressing points N, O, and P on the basis of the output from the capacitance type touch panel sensor 2.

Further, the controller 20 illustrated in FIG. 2 obtains the barycentric coordinates (X, Y) of and barycentric load (Z) on the pressing points N, O, and P on the basis of the outputs of the load detection sensors 3 (step ST12 (load detection step) in FIG. 6). The barycentric coordinates (X, Y) and the barycentric load (Z) can be obtained by the already-described equations (1).

Next, in step ST13 in FIG. 11, the controller 2 determines whether the pressing points N, O, and P are on the same straight line Q.

The determining method will be described using the following equations.

When the above-described equations (2) are applied to the positional coordinates (x11, y11), (x12, y12), and (x13, y13) of and the loads (z11, z12, z13) on the pressing points N, O, and P in FIG. 10, the following equations (5) are derived:

$$X = \frac{(z11 \cdot x11 + z12 \cdot x12 + z13 \cdot x13)}{(z11 + z12 + z13)} \quad (5)$$

$$Y = \frac{(z11 \cdot y11 + z12 \cdot y12 + z13 \cdot y13)}{(z11 + z12 + z13)}$$

$$Z = z11 + z12 + z13$$

Next, when equations (5) are rearranged for the loads (z11, z12, z13) to be obtained, the following equations (6) are derived:

$$X = \{x11/(z11+z12+z13)\}z11 + \{x12/(z11+z12+z13)\}z12 + \{x13/(z11+z12+z13)\}z13$$

$$Y = \{y11/(z11+z12+z13)\}z11 + \{y12/(z11+z12+z13)\}z12 + \{y13/(z11+z12+z13)\}z13$$

$$Z = z11 + z12 + z13 \quad (6)$$

Further, equations (6) are transformed to derive the following equation (7) in a matrix display:

$$\begin{pmatrix} X \\ Y \\ Z \end{pmatrix} = \begin{pmatrix} \frac{x11}{(z11+z12+z13)} & \frac{x12}{(z11+z12+z13)} & \frac{x13}{(z11+z12+z13)} \\ \frac{y11}{(z11+z12+z13)} & \frac{y12}{(z11+z12+z13)} & \frac{y13}{(z11+z12+z13)} \\ 1 & 1 & 1 \end{pmatrix} \begin{pmatrix} z11 \\ z12 \\ z13 \end{pmatrix} \quad (7)$$

The matrix on the left side constituting the right member of equation (7) is denoted by A, as indicated in the following equation (8):

$$A = \begin{pmatrix} \frac{x11}{(z11+z12+z13)} & \frac{x12}{(z11+z12+z13)} & \frac{x13}{(z11+z12+z13)} \\ \frac{y11}{(z11+z12+z13)} & \frac{y12}{(z11+z12+z13)} & \frac{y13}{(z11+z12+z13)} \\ 1 & 1 & 1 \end{pmatrix} \quad (8)$$

$$= \begin{pmatrix} \frac{x11}{Z} & \frac{x12}{Z} & \frac{x13}{Z} \\ \frac{y11}{Z} & \frac{y12}{Z} & \frac{y13}{Z} \\ 1 & 1 & 1 \end{pmatrix}$$

Accordingly, the matrix display can be simplified, as indicated in the following equation (9):

$$\begin{pmatrix} X \\ Y \\ Z \end{pmatrix} = A \begin{pmatrix} z11 \\ z12 \\ z13 \end{pmatrix} \quad (9)$$

Next, as indicated in the following equation (10), the inverse matrix of the matrix A is denoted by $A^{-1}$, and the left member and the right member of the equation are multiplied by the inverse matrix $A^{-1}$ to obtain the following equation (10):

$$A^{-1} \begin{pmatrix} X \\ Y \\ Z \end{pmatrix} = A^{-1} A \begin{pmatrix} z11 \\ z12 \\ z13 \end{pmatrix} = \begin{pmatrix} z11 \\ z12 \\ z13 \end{pmatrix} \quad (10)$$

As indicated in equation (10), when the inverse matrix $A^{-1}$ exists, the loads (z11, z12, z13) can be obtained.

Here, a condition where the inverse matrix $A^{-1}$ does not exist is the case in which the determinant of the matrix A is 0. That is, the inverse matrix $A^{-1}$ does not exist when the following equation (11) holds true:

$$\frac{x11}{(z11+z12+z13)} \cdot \frac{y12}{(z11+z12+z13)} + \quad (11)$$
$$\frac{x12}{(z11+z12+z13)} \cdot \frac{y13}{(z11+z12+z13)} +$$
$$\frac{x13}{(z11+z12+z13)} \cdot \frac{y11}{(z11+z12+z13)} -$$
$$\frac{x11}{(z11+z12+z13)} \cdot \frac{y13}{(z11+z12+z13)} -$$
$$\frac{x12}{(z11+z12+z13)} \cdot \frac{y11}{(z11+z12+z13)} -$$
$$\frac{x13}{(z11+z12+z13)} \cdot \frac{y12}{(z11+z12+z13)} = 0$$

Equation (11) is rearranged to derive the following equation (12):

$$x11y12 + x12y13 + x13y11 - x11y13 - x12y11 - x13y12 = 0 \quad (12)$$

A condition in which the above-described equation (12) holds true is the case in which the positional coordinates (x11, y11), (x12, y12), and (x13, y13) of the three pressing points N, O, and P are on the same straight line. Thus, when all the simultaneously-pressed pressing points N, O, and P are on, for example, the same straight line Q as in FIG. 10, the inverse matrix $A^{-1}$ does not exist. Therefore, the loads (z11, z12, z13) on the pressing points N, O, and P cannot be obtained.

In step ST13 (pressing point determination step) in FIG. 11, whether the pressing points N, O, and P are on the same straight line is determined by whether equation (12) holds true.

When equation (12) does not hold true and when it is thus determined that the pressing points N, O, and P are not on the same straight line, in step ST14, calculation of the loads on the pressing points N, O, and P is performed by equations (4).

When, in step ST13 in FIG. 11, equation (12) holds true and when it is thus determined that the pressing points N, O, and P are on the same straight line, the process proceeds to step ST15.

In step ST15 (correction step), the positional coordinate of any one of the pressing points is corrected. "Correction" here means slightly moving the positional coordinate. For example, x11 of the positional coordinates (x11, y11) of the pressing point N is slightly moved. The coordinate to be moved is such that, when the x coordinates of the pressing points N, O, and P match one another, the x coordinate is moved; when the y coordinates of the pressing points N, O, and P match one another, the y coordinate is moved. When the direction of the same straight line on which the pressing points N, O, and P are aligned is diagonally tilted with respect to the x-coordinate direction or the y-coordinate direction, one of the x coordinate and the y coordinate is moved.

With the correction of the positional coordinate in step ST15, the state becomes such that the pressing points N, O, and P are seemingly not on the same straight line.

Though the positional coordinates of two or more pressing points can be moved in step ST15, in that case, the loads (z11, z12, z13) on the pressing points N, O, and P calculated in step ST16 described later tend to become greatly shifted from the actual loads acting on the pressing points N, O, and P. Thus, it is preferred in step ST15 to slightly move the positional coordinate of one pressing point.

In the present embodiment here, the x coordinate (x11) of the pressing point N is slightly moved.

That is, x11=x11+a where a is a correction value. Here, a is set to, for example, 0.1. Though there is no restriction regarding the value of a, a is preferably less than or equal to 10% of the coordinate value.

Together with the correction of the positional coordinate of the pressing point N, correction is made on X of the barycentric coordinates (X, Y).

That is, when x11 in the equation of X in equations (6) is replaced with x11+a, the following equation (13) can be derived:

$$X=((x11+a)z11+x12z12+x13z13)/Z=(x11z11+x12z12+x13z13)/Z+az11Z \quad (13)$$

Here, when $z11/Z$ in equation (13) is denoted by b, $X=X+ab$. In this manner, the positional coordinate $x11$ is corrected to $x11+a$, and the barycentric coordinate X is similarly corrected to $X+ab$. Here, regarding the value of b, since $z11$ is $0<z11<Z$, b is $0<b<1$. For example, b is set to 0.5.

In step ST16 in FIG. 11, the loads ($z11$, $z12$, $z13$) on the pressing points N, O, and P are obtained by using the corrected positional coordinate ($x11+a$) and the corrected barycentric coordinate ($X+ab$) in the above-described equations (4).

Here, a specific example will be given. It is assumed that the positional coordinates of and the loads on the pressing points N, O, and P are ($x11$, $y11$, $z11$)=(1, 1, 1), ($x12$, $y12$, $z12$)=(1, 4, 2), and ($x13$, $y13$, $z13$)=(1, 10, 1). The barycentric coordinates (X, Y) and the barycentric load (Z) can be calculated as (X, Y, Z)=(1, 4.75, 4).

In the above-described specific example, all the x coordinates of the pressing points N, O, and P are 1, and the state is such that the pressing points N, O, and P are on the same straight line.

Therefore, for example, 0.1 is added as the correction value a to $x11$. Then, $x11$=1.1. Also, 0.1×0.2 is added as the correction value ab to the barycentric coordinate X. Accordingly, the barycentric coordinate X becomes 1.02.

Accordingly, when the specific values are applied to the individual components of the matrix A indicated in equation (8), a matrix A indicated in the following equations (14) can be obtained.

$$A = \begin{pmatrix} 0.275 & 0.25 & 0.25 \\ 0.25 & 1 & 2.5 \\ 1 & 1 & 1 \end{pmatrix} \quad (14)$$

$$A^{-1} = \begin{pmatrix} 40 & 0 & -10 \\ -60 & -0.6667 & 16.667 \\ 20 & 0.666 & -5.6667 \end{pmatrix}$$

Further, as indicated in equations (14), an inverse matrix $A^{-1}$ can be obtained.

Therefore, the relational expression indicated in equation (10) holds true, and in step ST16 (load calculation step) in FIG. 11, the loads ($z11$, $z12$, $z13$) on the pressing points N, O, and P can be obtained. As a result of the calculation, $z11$ was 0.8; $z12$ was 2.3; and $z13$ was 0.9. Originally, the actual loads acting on the pressing points N, O, and P are: $z1$=1, $z12$=2, and $z13$=1, and the approximate values were obtained. With the adjustments using the correction values a and ab, load values closer to the actual loads can be obtained.

Next, as illustrated in FIG. 11, the flow proceeds to step ST17 (load determination step). In step ST17, it is determined whether the loads ($z11$, $z12$, $z13$) on the pressing points N, O, and P, calculated in step ST16, are greater than 0 and less than the barycentric load Z. Because the loads on the pressing points are never less than or equal to 0 or greater than or equal to the barycentric load Z, if any one of the loads ($z11$, $z12$, $z13$) on the pressing points N, O, and P is less than or equal to 0 or greater than or equal to the barycentric load Z, the flow returns to step ST15. The value of b, which is the correction value for the barycentric coordinate, is changed, and load calculation is performed again. At this time, it is unnecessary to move the correction value a for the positional coordinate. No load calculation error occurs because of the value of the correction value a. Meanwhile, the correction value b is indicated by $z11/Z$, as described above, and it is unclear at the point of step ST15 how large the proportion of $z11$ is with respect to Z. Thus, in the above case, b was calculated as 0.2. If the value 0.2 is significantly shifted from the actually measured value of $z11/Z$, any of the loads tends to be calculated as an error value less than or equal to 0 or greater than or equal to Z. Therefore, when any of the loads is less than or equal to 0 or greater than or equal to Z in step ST17, the flow returns to step ST15, the correction value b is changed, and load calculation is performed again.

When all the loads become values that are greater than 0 and less than the barycentric load Z, the flow proceeds to step ST18, and image display processing is performed on the liquid crystal display 10 on the basis of the pieces of data including the loads on and the positional coordinates of the pressing points.

The input device (touch panel) 1 according to the present embodiment is applicable to a mobile phone, a mobile information processing apparatus, a mobile storage device, a mobile game machine, or the like.

What is claimed is:

1. An input device comprising:
    a position detection sensor configured to detect respective positions of multiple pressing points on an operation face that are simultaneously pressed;
    a load detection sensor configured to detect a position of a barycenter of the multiple pressing points and a load on the barycenter; and
    a controller configured to calculate respective loads on the multiple pressing points based on coordinates of the positions of the multiple pressing points, coordinates of the position of the barycenter, and the load on the barycenter,
    wherein the controller is further configured to determine whether or not three pressing points that are simultaneously pressed are all on a same straight line, and if simultaneously-pressed three pressing points are all on the same straight line, the controller corrects the coordinates of the position of one of the pressing points and the coordinates of the position of the barycenter so as to calculate the respective loads on the pressing points.

2. The input device according to claim 1, further comprising:
    a panel having a front surface which is the operation face and a back surface,
    wherein the load detection sensor includes a plurality of load detection sensors provided in a periphery region of the back surface of the panel.

3. The input device according to claim 1, wherein the position detection sensor is a capacitance type touch panel sensor.

4. The input device according to claim 1, wherein if x-coordinates of the pressing points match one another, the controller shifts one of the x-coordinates; if y-coordinates of the pressing points match one another, the controller shifts one of the y-coordinates; and if a direction of the straight line on which the pressing points are aligned is diagonally tilted with respect to an x-axis and y-axis, the controller shifts one of the x-coordinates or one of the y-coordinates of the pressing points.

5. A multiple point load detecting method for obtaining respective loads of a plurality of pressing points on an operation face which are simultaneously pressed using a position detection sensor and a load detection sensor, the method comprising:

obtaining respective positions of the plurality of pressing points based on an output of the position detection sensor;

obtaining a position of a barycenter of the plurality of pressing points and a load on the barycenter based on an output of the load detection sensor; and calculating respective loads on the plurality of pressing points based on coordinates of the positions of the plurality of pressing points, coordinates of the position of the barycenter, and the load on the barycenter, wherein the method further comprises, after obtaining the respective positions and before calculating the respective loads:

detecting whether or not three pressing points that are simultaneously pressed are all on a same straight line;

if it is detected that all of the three pressing points are on the same straight line, correcting the coordinates of the position of one of the plurality of pressing points and coordinates of position of the barycenter; and     if it is not detected that all of the pressing points are on the same straight line, proceeding to the calculating the respective loads, and wherein, when the correcting the coordinates is performed, the calculating the respective loads uses the corrected coordinates of the one of the positions of the pressing points and the corrected coordinates of the position of the barycenter.

6. The multiple point load detecting method according to claim 5, further comprising:

if the correcting the coordinates is performed, determining whether or not each of the calculated loads on the pressing points is greater than 0 and less than the load of the barycenter; and     if the calculated load on any of the pressing points is less than or equal to 0 or greater than or equal to the load of the barycenter, repeating the correcting the coordinates by changing a correction value for the coordinates of the barycenter, and performing the calculating the respective loads again using the changed correction value.

\* \* \* \* \*